(12) United States Patent
Balko et al.

(10) Patent No.: US 8,849,747 B2
(45) Date of Patent: Sep. 30, 2014

(54) BUSINESS PROCESS MANAGEMENT

(75) Inventors: Sören Balko, Weinheim (DE); Kesavaprakash Vasudevan, Heidelberg (DE)

(73) Assignee: SAP AG, Walldorf (DE)

( * ) Notice: Subject to any disclaimer, the term of this patent is extended or adjusted under 35 U.S.C. 154(b) by 205 days.

(21) Appl. No.: 13/454,372

(22) Filed: Apr. 24, 2012

(65) Prior Publication Data
US 2013/0282746 A1    Oct. 24, 2013

(51) Int. Cl.
*G06F 17/30* (2006.01)

(52) U.S. Cl.
USPC ........... 707/602; 707/758; 707/792; 707/798; 707/802; 707/809; 717/104; 717/132; 717/144; 717/155; 717/156

(58) Field of Classification Search
CPC ..... G06F 17/30; G06F 17/30958; G06F 7/00; G06F 8/40; G06Q 10/00; G06Q 10/103; G06Q 10/067
USPC ................. 707/601–602, 758, 792, 798, 802; 717/100, 104, 144, 132, 155–156
See application file for complete search history.

(56) References Cited

U.S. PATENT DOCUMENTS

| | | | |
|---|---|---|---|
| 6,073,111 A * | 6/2000 | Leymann et al. | 705/7.12 |
| 6,308,224 B1 * | 10/2001 | Leymann et al. | 719/310 |
| 7,013,289 B2 * | 3/2006 | Horn et al. | 705/14.51 |
| 7,571,192 B2 * | 8/2009 | Gupta et al. | 1/1 |
| 8,046,383 B2 | 10/2011 | Weber et al. | |
| 8,150,736 B2 * | 4/2012 | Horn et al. | 705/26.1 |
| 8,510,320 B2 * | 8/2013 | Balko | 707/758 |
| 2004/0224674 A1 * | 11/2004 | O'Farrell et al. | 455/418 |
| 2006/0195476 A1 * | 8/2006 | Nori et al. | 707/104.1 |
| 2007/0044069 A1 * | 2/2007 | Doucette et al. | 717/106 |
| 2007/0174763 A1 * | 7/2007 | Chang et al. | 715/513 |
| 2007/0219976 A1 * | 9/2007 | Muralidhar et al. | 707/4 |
| 2008/0189323 A1 * | 8/2008 | Chang et al. | 707/102 |
| 2008/0307392 A1 * | 12/2008 | Racca et al. | 717/120 |
| 2009/0164985 A1 * | 6/2009 | Balko et al. | 717/162 |
| 2009/0193433 A1 * | 7/2009 | Maes | 719/315 |
| 2010/0251230 A1 * | 9/2010 | O'Farrell et al. | 717/173 |
| 2011/0029577 A1 * | 2/2011 | Notani et al. | 707/804 |
| 2011/0191383 A1 * | 8/2011 | Addala et al. | 707/797 |
| 2012/0041794 A1 * | 2/2012 | Lemcke et al. | 705/7.11 |
| 2013/0067476 A1 * | 3/2013 | Rosenberg et al. | 718/100 |
| 2013/0104099 A1 * | 4/2013 | Gores et al. | 717/104 |

(Continued)

OTHER PUBLICATIONS

Wikipedia, "Business Process Model and Notation" en.wikipedia.org/wiki/Business_Process_Model_and_Notation, Mar. 8, 2012 (14 pages).

(Continued)

*Primary Examiner* — Hanh Thai
(74) *Attorney, Agent, or Firm* — Fish & Richardson P.C.

(57) ABSTRACT

Systems, methods, apparatus, and computer-readable media for business process management include identifying a business process model generated with a business process modeling tool; transforming the business process model defined in a first format to one or more artifacts defined in a second format; deploying an output file defined by the one or more artifacts in an in-memory database; and executing the output file in the in-memory database base at least in part on one or more processes executing in the in-memory database in response to a received query for data stored in the in-memory database.

27 Claims, 4 Drawing Sheets

(56) References Cited

U.S. PATENT DOCUMENTS

| | | | |
|---|---|---|---|
| 2013/0138473 A1* | 5/2013 | Balko et al. | 705/7.27 |
| 2013/0139164 A1* | 5/2013 | Balko | 718/102 |
| 2013/0144957 A1* | 6/2013 | Sherman et al. | 709/206 |
| 2013/0166495 A1* | 6/2013 | Kazmaier et al. | 707/602 |
| 2013/0166496 A1* | 6/2013 | Sachs et al. | 707/602 |
| 2013/0166497 A1* | 6/2013 | Schroetel et al. | 707/602 |
| 2013/0166892 A1* | 6/2013 | Sachs et al. | 713/1 |

OTHER PUBLICATIONS

Wikipedia, "Business Process Management" en.wikipedia.org/wiki/Business_process_management, Mar. 8, 2012 (5 pages).

Ultimus "Ultimus Thalamus: Inside the Ultimus Mind" www.ultimus.com/Blog/bid/33830/What-is-SAP-and-How-Does-BPM-Integrated-With-It, Mar. 8, 2012 (3 pages).

"Business Process Management" www.sdn.sap.com/irj/sdn/business-process-management, Mar. 8, 2012 (2 pages).

SAP, "SAP Netweaver Process Orchestration" www.sap.com/platform/netweaver/compenents/process-orchestration/index.epx, Mar. 8, 2912 (2 pages).

Balko et al., "Framework for Ad-Hoc Process Flexibility" U.S. Appl. No. 12/848,679, filed Aug. 2, 2010.

Balko, "High-Load Business Process Scalability" U.S. Appl. No. 13/094,366, filed Apr. 26, 2011.

Klinker et al., "Systems and Methods for Business Process Logging" U.S. Appl. No. 13/102,837, filed May 6, 2011.

Balko, "Silent Migration of Business Process Binaries" U.S. Appl. No. 13/206,960, filed Aug. 10, 2011.

Balko, "Transaction Load Reduction for Process Completion" U.S. Appl. No. 13/289,606, filed Nov. 4, 2011.

* cited by examiner

BUSINESS PROCESS MANAGEMENT

TECHNICAL BACKGROUND

This disclosure relates to business process management and, more particularly, business process management capabilities as part of a database.

BACKGROUND

Business process management suites (BPMS) may be employed to pursue a model-driven approach to automating and monitoring business processes. A graphical process model which results from some process analysis or re-engineering phase may be enacted (e.g., deployed to a production system where it automates and enforces the corresponding process) with short turnaround times, saving on development cost for custom business applications. As a result, BPMS are often used to provide custom functionality layered on top of "core" business applications (e.g., standard procedures that are implemented by an enterprise resource planning (ERP) suite). ERP suites typically provide for CRUD (Create, Read, Update, and Delete) service interfaces to let BPMS act on business data and/or business objects that are managed by an ERP system. As a result, business processes running in a BPMS may be confined to operations that are accessible through these services. In effect, much functionality (e.g., tracking states of business objects, changing a business object's underlying status and action model) is out of reach for BPMS-based business processes.

SUMMARY

This disclosure describes general embodiments of systems, methods, apparatus, and computer-readable media for business process management that include identifying a business process model generated with a business process modeling tool; transforming the business process model defined in a first format to one or more artifacts defined in a second format; deploying an output file defined by the one or more artifacts in an in-memory database; and executing the output file in the in-memory database base at least in part on one or more processes executing in the in-memory database in response to a received query for data stored in the in-memory database.

In a first aspect combinable with any of the general embodiments, the business process model defined in a first format includes a business process model defined in BPMN 2.0, and the one or more artifacts defined in a second format include one or more SQL/SQLScript definitions.

In a second aspect combinable with any of the previous aspects, transforming the business process model defined in a first format to one or more artifacts defined in a second format includes compiling the business process model defined in BPMN 2.0 into the one or more SQL/SQLScript definitions.

In a third aspect combinable with any of the previous aspects, compiling the business process model defined in BPMN 2.0 into the one or more SQL/SQLScript definitions includes parsing the business process model defined in BPMN 2.0 into a directed graph including one or more typed nodes and one or more edges; traversing the directed graph to generate a plurality of SQLScript fragments; and assembling the plurality of SQLScript fragments into the one or more SQL/SQLScript definitions.

In a fourth aspect combinable with any of the previous aspects, the one or more typed nodes define one or more process steps and the one or more edges define one or more control flow connectors.

A fifth aspect combinable with any of the previous aspects further includes assigning a unique token position to each of the one or more edges.

In a sixth aspect combinable with any of the previous aspects, traversing the directed graph to generate a plurality of SQLScript fragments includes generating the plurality of SQLScript fragments based on the one or more process steps, each SQLScript fragment defining at least a queue sub-query of a particular process step.

In a seventh aspect combinable with any of the previous aspects, the one or more SQL/SQLScript definitions include at least one of a queue definition, a scheduler, and a process API.

An eighth aspect combinable with any of the previous aspects further includes emitting the output file including the queue definition, the scheduler, and the process API.

In a ninth aspect combinable with any of the previous aspects, the one or more SQL/SQLScript definitions further include one or more user-defined SQLScript procedures.

Various embodiments of a business process management suite (BPMS) runtime layered on an in-memory database in accordance with the present disclosure may include one, some, or all of the following features. For example, the BPMS may facilitate business applications interoperability with an in-memory database that take advantage of the real time performance of the in-memory database. Further, the BPMS may provide for layering of standard process modeling languages (e.g., BPM Notation (BPMN) 2.0) on the in-memory database programming model. Further, the BPMS may also implement fundamental runtime features (e.g., a process step scheduler and others). As a result, the expressiveness of BPMS is blended with processing gaining native access to business data (e.g., all business data) stored in in-memory database. By implementing a BPMS runtime in the in-memory database, core capabilities, such as, for example, real-time performance, cluster-awareness (scale-out), failover, archiving (backup and recovery), persistency, multi-threading and concurrency control, authentication and authorization mechanisms, and other capabilities, may be obtained as benefits in the BPMS. Thus, in some examples, complexity of a BPMS runtime (which conventionally had to provide for those features by itself) may be greatly reduced.

Various embodiments of a business process management suite (BPMS) runtime layered on an in-memory database in accordance with the present disclosure may also include one, some, or all of the following features. For example, total cost of development may be reduced as the in-memory database stack may natively provide for many infrastructure capabilities that may be desirable to implement an enterprise-ready, scalable BPMS. For example, multithreading and concurrency control, cluster-awareness and scale-out, caching (i.e., in-memory), transactionality (e.g., consistent processing of grouped database operations fully adhering to (1) atomicity, (2) data consistency, (3) isolation, (4) durability criteria), persistency, archiving (i.e., backup), failover (i.e., re-startability), lifecycle, and others. As a result, the cost of offering BPM services on top of the in-memory database may be less than (e.g., several orders of magnitude) implementing a BPMS from scratch or on top of another application server infrastructure (e.g., a JEE server, a .NET server, an ABAP server, or a cloud infrastructure programming model such as OpenStack, Eucalyptus, or OpenNebula).

As another example, total cost of ownership may be reduced by, for instance, having a single in-memory database stack provide for database and BPM services. Thus, cost of ownership (configuration and maintenance efforts, hardware deployment, energy consumption, etc.) may be much less.

Business enterprises may also benefit from skill sets that apply to both database and BPMS administration in the in-memory database, thus driving down personnel education cost.

As another example, risk may be reduced by implementing BPM services atop the in-memory database that uses the in-memory database programming model and deliberately relinquishes any attempts to extend the in-memory database stack with any extra functionality to support the BPM use-case. For example, a reduction in risk may occur for maintaining the BPM services, which only depend on well-established functionality of the in-memory database.

As yet another example, a business process management suite (BPMS) runtime layered on an in-memory database may have enhanced capabilities, because, for example, BPM services that are natively integrated into the in-memory database as "first-level citizens" (e.g., as SQL statements and SQLScript procedures, or another "stored procedure" dialect) may obtain direct access to other in-memory database content (e.g., database representations of business objects and other business data). As a result, BPMS-based business processes may no longer be confined to "out-of-the-box" ERP service interfaces to access "business data." In other words, any portion of a business object may be accessed by a business process and constrained only by the database's authorization scheme. Further, the in-memory database may provide for rich analytics capabilities out of the box which may be used from within processes and also be employed to derive data from completed process instances (e.g., for predictive process analytics).

As yet another example, a business process management suite (BPMS) runtime layered on an in-memory database may provide for a standardized programming model such as, for example, BPMN or BPEL. Such a standardized programming model, as opposed to, for instance, SQLScript, may be understood by non-technical personas like business analysts. In effect, the performance benefits of in-memory database are, thus, served to a much broader audience. As another example, the BPMS runtime may provide for simplification by facilitating "business level" programming entities such as activities, tasks, decisions (gateways), events and plain "arrows" (control flow connectors) to specify an execution order of business processes, rather than, for instance, regular database operations (e.g., SQL/SQLScript), which may be very technical and act on the "raw" database entities (e.g., tables, views, etc.). For example, a process model coming out of a process analysis/re-engineering effort is merely refined and augmented with some technical details before it is deployed into a production system (e.g., the database system.

These general and specific aspects can be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

Figure 1:
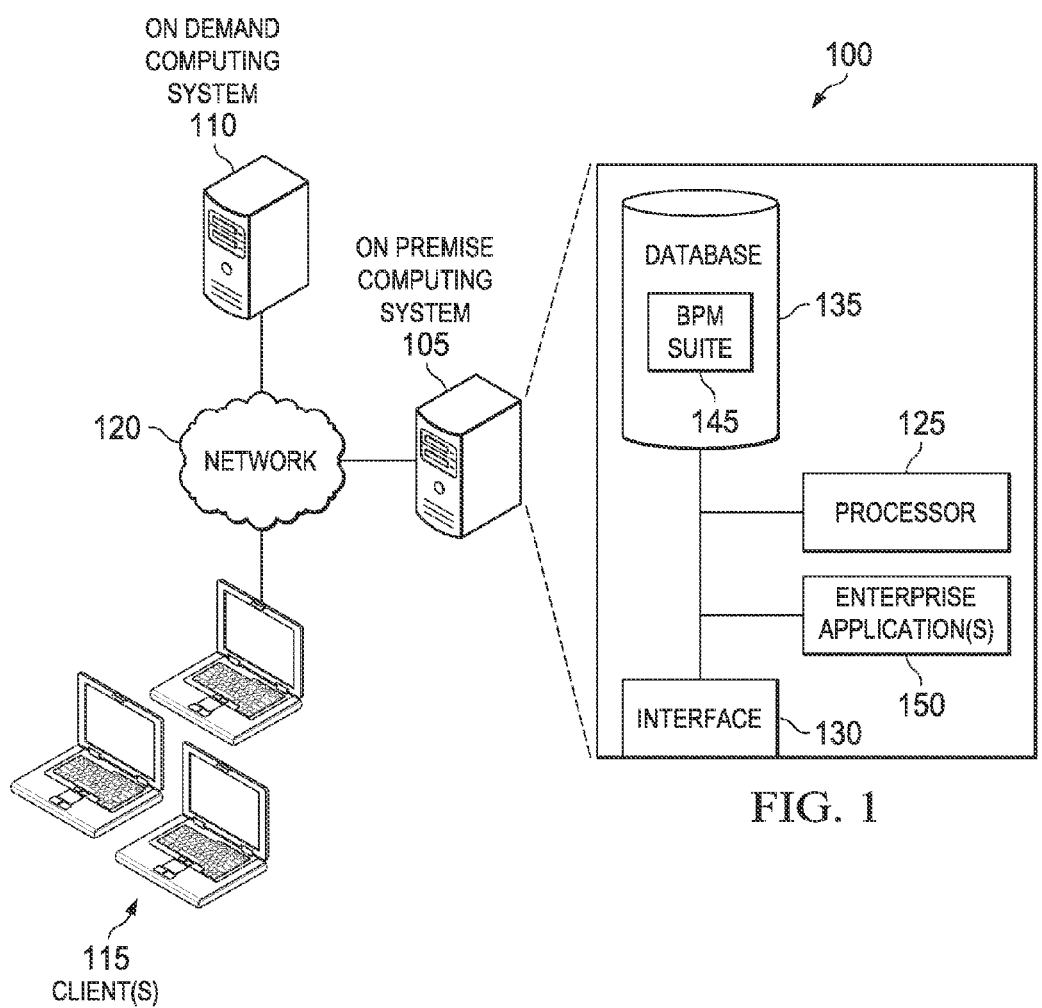
FIG. 1 illustrates an example distributed computing system including a business process management suite (BPMS) runtime layered on an in-memory database.

FIG. 1 illustrates an example distributed computing system 100 including a business process management suite (BPMS) runtime 145 layered on an in-memory database 135. As illustrated, the system 100 includes an on-demand computing system 110, an on-premise computing system 105, and one or more clients 115 communicably coupled through a network 120. In alternative embodiments, however, one or more of these components may not be part of the distributed computing system 100 without departing from the scope of the present disclosure. For instance, in some embodiments, the on-demand computing system 110 may not be included in the system 100, and logic (e.g., software, middleware, source code, executable instructions, data, and otherwise) illustrated as residing on the on-demand computing system 110 may be located on, for example, the on-premise computing system 105 or another computing system communicably coupled through the network 120. In any event, the illustrated system 100 may have alternative embodiments where various components (e.g., servers, databases, software modules, and otherwise) are not present or reside in or on different appliances than shown in FIG. 1. For example, in some embodiments, the BPMS runtime 145 may be located on the on-demand computing system 110, for example, in a cloud-based computing environment.

Each of the on-demand computing system 110 and on-premise computing system 105 includes a server appliance having a processor and an interface. For example, the illustrated on-premise computing system 105 includes a processor (or processors) 125 and an interface (or interfaces) 130. As further illustrated, the on-premise computing system 105 includes the BPMS runtime 145 included in (e.g., layered on) the in-memory database 135, with its functionality implemented (e.g., as SQL entities and SQLScript procedures) within the in-memory database 135. At a high level, the BPMS runtime 145 included in (e.g., layered on) the in-memory database 135 may identify and transform a business process model, for example, in BPMN 2.0 format, to SQLScript definitions or procedures to be executed in the in-memory database 135. Alternatively, the transformation of the business process model may be implemented by a compiler outside of, but communicably coupled to, the BPMS runtime 145. The SQLScript definitions or procedures may then execute in the in-memory database 135 based on queries and update statements from users for business data stored in the database 135. More details regarding the operation of the BPMS runtime 145 are provided below and in the accompanying figures.

In general, the on-demand computing system 110 and on-premise computing system 105 may each be one or more servers that store applications, software, middleware, and data, for example, the BPMS runtime 145, one or more enterprise applications 150, and any hosted applications located on the on-demand computing system 110. In some instances, the on-demand computing system 110 and on-premise computing system 105 may each store a plurality of various applications. In some instances, the on-demand computing system 110 and on-premise computing system 105 may each comprise a web server, where the BPMS runtime 145, the applications 145, and any other applications represent one or more web-based applications accessed and executed via network 120 by the clients 115, or other clients of the system 100 to perform the programmed tasks or operations of the BPMS runtime 145. In some embodiments, the BPMS runtime 145 may be accessible thru interfaces of the in-memory database 135 (e.g., through a Web channel).

At a high level, the on-demand computing system 110 and on-premise computing system 105 each represents an electronic computing device operable to receive, transmit, process, store, or manage data and information associated with the system 100. For example, the on-premise computing system 105 may be responsible for receiving application requests from one or more client applications associated with the clients 115 of system 100 (e.g., enterprise clients or other clients) and responding to the received requests by processing said requests with the BPMS runtime 145, enterprise applications 150, and/or other application, and sending the appropriate response back to the requesting clients 115 illustrated in FIG. 1. Requests associated with the BPMS runtime 145 and/or other applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server associated with the on-demand computing system 110 and a single server associated with the on-premise computing system 105, system 100 can be implemented using two or more servers at each of the on-demand computing system 110 and the on-premise computing system 105, as well as computers other than servers, including a server pool. Indeed, on-demand computing system 110 and on-premise computing system 105 may each be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated on-demand computing system 110 and on-premise computing system 105 may each be adapted to execute any operating system, including Linux, UNIX, Windows, Mac OS, or any other suitable operating system.

At a high level, the BPMS runtime 145 is any application, program, module, process, or other software that may execute, change, delete, generate, or otherwise manage information according to the present disclosure, particularly in response to and in connection with one or more requests received from the illustrated clients 115 and their associated client applications. In certain cases, system 100 may implement a composite BPMS runtime 145. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the BPMS runtime 145 may represent web-based applications accessed and executed by remote clients or client applications via the network 120 (e.g., through the Internet). Further, while illustrated as internal to the on-premise computing system 105, one or more processes associated with the BPMS runtime 145 may be stored, referenced, or executed remotely. For example, a portion of the BPMS runtime 145 may be a web service associated with the application that is remotely called, while another portion of the BPMS runtime 145 may be an interface object or agent bundled for processing at a remote client. Moreover, any or all of the BPMS runtime 145 may be a child or sub-module of another software module or enterprise application (not illustrated) without departing from the scope of this disclosure. Still further, portions of the BPMS runtime 145 may be executed by a user working directly at the on-premise computing system 105 as well as remotely.

The illustrated interface 130 (and other interfaces, not shown) may be used by the on-premise computing system 105 for communicating with other systems in a client-server or other distributed environment (including within system 100) connected to the network 120 (e.g., clients 115 as well as other systems communicably coupled to the network 120). Generally, the interface 130 includes logic encoded in software and/or hardware in a suitable combination and operable to communicate with the network 120. More specifically, the interface 130 may comprise software supporting one or more communication protocols associated with communications such that the network 120 or interface's hardware is operable to communicate physical signals within and outside of the illustrated system 100.

As illustrated in FIG. 1, the on-demand computing system 110 and the on-premise computing system 105 each includes a processor. The on-premise computing system 105, as illustrated, include the processor 125. Although illustrated as a single processor 125 in FIG. 1, two or more processors may be used according to particular needs, desires, or particular embodiments of system 100. Each processor 125 may be a central processing unit (CPU), a blade, an application specific integrated circuit (ASIC), a field-programmable gate array (FPGA), or another suitable component. Generally, the processor 125 executes instructions and manipulates data to perform the operations of the respective on-demand computing system 110 or on-premise computing system 105 and, specifically, the BPMS runtime 145, applications 145, and other applications. Specifically, the processor 125 executes the functionality required to receive and respond to requests from the clients 115 and their respective client applications, as well as the functionality required to perform the other operations of the BPMS runtime 145.

Regardless of the particular implementation, "software" may include computer-readable instructions, firmware, wired or programmed hardware, or any combination thereof on a tangible, non-transitory (or in some instance transitory) medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, for example, the processor 125 executes the respective portion (all are a part) of the applications on the on-premise computing system 105.

Generally, the network 120 facilitates wireless or wireline communications between the components of the system 100 (i.e., between the on-demand computing system 110 and on-premise computing system 105 and the clients 115), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the clients 115 and the on-demand computing system 110 and the on-premise computing system 105. Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated system 100.

The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated in-memory database 135, in some embodiments, may be capable of performing complex processing and analysis tasks on business data (and in some cases vast amounts of data) in seconds or even real time (e.g., with no or substantially no human-appreciable delay). In some instances, the in-memory database 135 may introduce a highly expressive programming model that goes beyond native SQL, such as SQLScript and a Business Function Library (BFL) for scripted SQL batch processing (or other programming models aimed at software engineers having a technical background with some fundamental understanding of developing middleware software in general (which includes using scripting languages) and interoperating with databases using SQL and OLAP operators, specifically). The in-memory database 135 may also implement JavaScript for providing Web applications on top of the in-memory stack.

In some embodiments, the in-memory database 135 may include a programming model with public APIs implementing SQLScript. Characteristics of such a programming model may include one or more of the following: reusable stored procedures; SQL statements (optionally with side effects); basic control flow (e.g., conditionals, loops, cursor iteration, nested procedure calls); parameter passing (in/out); scalar and table types and variables, and others. Component models of such a programming model may include, for instance, attribute views, analytic views, and calculation views; suitability for analytics use-cases (e.g., rules, facts, complex calculations, etc.); tooling support in an in-memory database studio; package-based component model; and/or no side effects.

In some embodiments, the in-memory database 135 may expose business data and capabilities to improve an end-solution for end users (e.g., the clients 115). The BPMS runtime 145 may reside on top of (e.g., within) a computational engine (e.g., in the in-memory database 135 the or otherwise) that facilitates fast manipulations on large amounts of business data and/or replication of entire business suite information. Thus, in some embodiments, the in-memory database may provide for the following design principles/concepts: business data in real-time or near real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Each of the illustrated clients 115 may be any computing device operable to connect to or communicate with at least the on-demand computing system 110 and on-premise computing system 105 and/or via the network 120 using a wireline or wireless connection. Further, each illustrated client typically includes a processor, an interface, a graphical user interface (GUI), a client application, and a memory. In general, each illustrated client comprises an electronic computer device operable to receive, transmit, process, and store any appropriate data associated with the system 100 of FIG. 1.

There may be any number of clients associated with, or external to, system 100. For example, while illustrated system 100 includes clients 115, alternative implementations of system 100 may include a single client communicably coupled to the on-demand computing system 110 and on-premise computing system 105, or any other number suitable to the purposes of the system 100. Additionally, there may also be one or more additional clients external to the illustrated portion of system 100 that are capable of interacting with the system 100 via the network 120. Further, the term "client" and "user" may be used interchangeably as appropriate without departing from the scope of this disclosure. Moreover, while each client is described in terms of being used by a single user, this disclosure contemplates that many users may use one computer, or that one user may use multiple computers.

As used in this disclosure, "client" is intended to encompass a personal computer, touch screen terminal, workstation, network computer, kiosk, wireless data port, smart phone, personal data assistant (PDA), one or more processors within these or other devices, or any other suitable processing device. For example, each client may comprise a computer that includes an input device, such as a keypad, touch screen, mouse, or other device that can accept user information, and an output device that conveys information associated with the operation of the on-demand computing system 110 and the on-premise computing system 105 (and BPMS runtime 145) or the client itself, including digital data, visual information, the client application, or the GUI.

Both the input and output device may include fixed or removable storage media such as a magnetic storage media, CD-ROM, or other suitable media to both receive input from and provide output to users of the clients through the display, namely, the GUI.

A GUI typically comprises a graphical user interface operable to interface with at least a portion of system 100 for any suitable purpose, including generating a visual representation of client application (in some instances, the client's web browser) and the interactions with the BPMS runtime 145, including the responses received from the BPMS runtime 145 received in response to the requests sent by a client application. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI can represent any graphical user interface, including but not limited to, a web browser, touch screen, or command line interface (CLI) that processes information in system 100 and efficiently presents the information results to the user.

In general, a GUI may include a plurality of user interface (UI) elements, some or all associated with a client application or the BPMS runtime 145, such as interactive fields, pull-down lists, and buttons operable by the user at a particular client. These and other UI elements may be related to or represent the functions of the client application, as well as other software applications executable from a particular illustrated client. For purposes of the present location, a GUI may be a part of or the entirety of a client application, while also merely a tool for displaying the visual representation of application actions and interactions.

Figure 2:
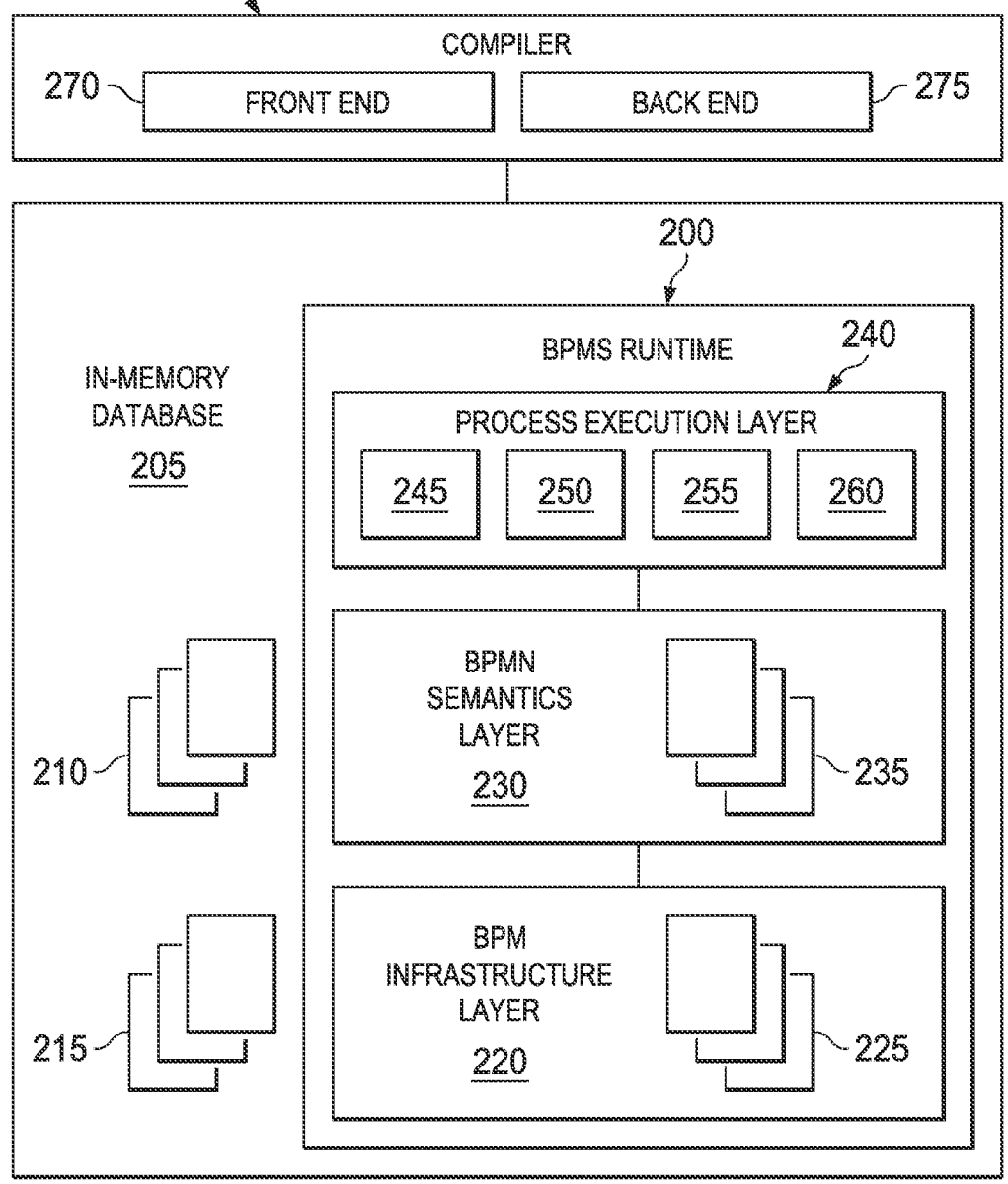
FIG. 2 illustrates an example architecture of a BPMS runtime layered on an in-memory database.

FIG. 2 illustrates an example architecture of a BPMS runtime 200 layered on an in-memory database 205. In some embodiments, the illustrated architecture may be implemented in a distributed computing system, such as, for example, the distributed computing system 100 shown in FIG. 1. Alternatively, the illustrated architecture may be implemented in other distributed computing systems other than that illustrated in FIG. 1.

The illustrated BPMS runtime 200, in some embodiments, maps process models and core runtime components to database views and stored procedures coded in, for example, SQLScript, or other script programming language. The illustrated BPMS runtime 200 includes a BPM Infrastructure Layer 220, a BPMN Semantics Layer 230, and a Process Execution Layer 240. In the illustrated embodiment, the BPMS runtime 200 also includes a compiler 265. But in alternative embodiments, the compiler 265 may be a separate component apart from the BPMS 200.

The illustrated BPM Infrastructure Layer 220, at a high level, provides for fundamental BPM data structures (e.g., processes, tokens, and events). For example, generic process management features (e.g., for process monitoring and administration, etc.) and (partially) repository capabilities (e.g., for process lifecycle and versioning, etc.) may be based on the BPM Infrastructure Layer 220. Such features may (in addition to external user interfaces) require additional data structures and/or procedures that are logically part of the BPM Infrastructure Layer 220.

The illustrated BPMN Semantics Layer 230, at a high level, provides for a large set of reusable procedures (e.g., SQLScript procedures) that generically execute BPMN artifacts (e.g., activities, gateways, events, etc.). Procedures in this layer may be parameterized to assume a concrete desired semantics for a specific process model. For instance, a parallel split gateway procedure can be parameterized with the process and token identifiers triggering that gateway, the number of outbound branches, and the token "positions" for these branches in order to create exactly as many tokens (parallel threads of control) starting processing concrete control flow "branches" as required for the specific Parallel Split gateway in some process model.

The illustrated Process Execution Layer 240, at a high level, provides a process-specific view definition (named "Queue") which at any point in time may list ready-to-execute process steps with their specific parameters, and a procedure (e.g., a SQLScript procedure) acting as process scheduler, which may fetch process steps from that "Queue" view definition and trigger corresponding parameterized procedures from the BPM semantics layer 230. In some embodiments, each process model is compiled into those two artifacts such that there may be multiple Process Execution Layers 240, one for each "deployed" process model.

The compiler 265 includes a front end 270 and a back end 275. At a high level, the compiler 265 may transform a process model (e.g., given in BPMN 2.0 exchange format) into the artifacts of the Process Execution Layer 240 (i.e., the process-specific "Queue" view definition and the "Scheduler" procedure). In some embodiments, the front end 270 may, for example, parse the process model (e.g., the BPMN 2.0 file, a BPL file, or some other process modeling standard), into a directed graph of typed nodes (representing process steps) and edges (representing control flow connectors), which jointly act as the process's intermediate representation within the compiler 240. The front end 270 may further assign unique token positions to all graph edges (control flow connectors).

In some embodiments, the back end 275 may, for example, traverse the graph and let each process step therein generate, for example, SQL and SQLScript fragments representing the process step's queue sub-query and (if present) custom procedures. Further, the back end 275 may then assemble these code fragments into the queue definition, the scheduler, the process API, and custom procedures, which are emitted into an output file (described more fully below). In some embodiments, the compiler 265 may be invoked with the command line:

bpmn2inmemory.xx- I <input file> -o <output file> -n <process name> where, the input file is the process model and output file is the file to which the collective process execution layer entities are written to (e.g., the output file does not normally exist before the compiler is invoked, if it does, it is overwritten).

The illustrated in-memory database 205, in some embodiments, may include includes volatile electronic memory (e.g., RAM) that stores one or more database tables 210, one or more data cubes 215, as well as other business data (e.g., business objects and otherwise). For example, the data cube 215 may be OLAP cubes (online analytical processing) that consist of data structures that allow for columnar data storage rather than, e.g., row data storage; different types of indices compared to relational databases; and in-memory technology as compared to data stored in relational databases. The data cube 205 may also allow manipulation and/or analysis of the data stored in the cube from multiple perspectives, e.g., by dimensions, measures, and/or elements of the cube 205. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube 205 may have three-dimensions, but any number of dimensions may be designed into the cube 205 (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube 205. For instance, the data cube 205 may be pivoted, in various ways. Each pivot provides the business user with a distinct view of particular business data stored in the cube 205. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube 205 in real-time may allow the business user to more efficiently analyze the business data.

Turning to the BPM Infrastructure Layer 220, one or more data structures 225 are stored in this layer. Such data structures 225 may include, for example, processes, tokens, events, and otherwise. Entities of the BPM Infrastructure Layer 220 may be stored in a schema "BPM." For example, representations of the processes may be centered around process instances and tokens therein, which become records in a PROCESSES and TOKENS table, respectively. Process instances may denote the existence and lifetime of a single instantiation of some process model. Process instances may carry some metadata attributes, such as, for example, a SUSPENDED flag, denoting whether or not the process can currently make and progress. Process instances may also be nested, forming hierarchies of parent processes and sub processes, represented by a PARENT_ID foreign key attribute, identifying one process instance's parent process and another PARENT_TOKEN_ID foreign key attribute that identifies the parent process's token, which has triggered the sub-process activity launching the particular (sub-) process instance. The sub-process instance may, in some embodiment, be used to correctly resume an (invoking) parent process when the (invoked) sub-process is complete.

For top-level processes, both PARENT_ID and PARENT_TOKEN_ID may default to NULL. A MODEL_ID string may denote a unique symbolic name of the associated process model. In one example convention, the Process Execution Layer 240 entities for that process model may be provided in an identically named schema, according to the following example pseudo code portion:

```
CREATE COLUMN [or ROW] TABLE "BPM"."PROCESSES" (
    "ID" INTEGER PRIMARY KEY,
    "MODEL_ID" VARCHAR(100),
    "PARENT_ID" INTEGER DEFAULT NULL,
    "PARENT_TOKEN_ID" INTEGER DEFAULT NULL,
    "SUSPENDED" TINYINT DEFAULT 0
);
```

Tokens, in turn, may represent a thread of control within a process instance (e.g., markers walking through the corresponding process model). Whatever process step a token currently "points to" may, in some instances, be the next step to be executed. Multiple tokens within one process instance may denote multiple concurrent threads making simultaneous (e.g., substantially or otherwise) progress in that process instance. Tokens reference their corresponding process instance in a PROCESS_ID attribute and denote their position inside the process model by a POSITION attribute (e.g., an integer), which corresponds to the unique integer label of some control flow connector, which was assigned by the compiler, according to the following example pseudo code portion:

```
CREATE COLUMN TABLE "BPM"."TOKENS" (
    "ID" INTEGER PRIMARY KEY,
```
-continued
```
    "PROCESS_ID" INTEGER,
    "POSITION" SMALLINT
);
```

Further extensions to the prototype may add other capabilities such as to suspend single tokens, thus, halting one (in possibly many) threads that simultaneously make progress in one process instance (as opposed to suspending the entire process instance through a PROCESSES.SUSPENDED attribute). In some embodiments, additional tables (not shown) may exist for logging a process instance's course of execution and for representing events.

To facilitate dynamically parameterizing procedures within the BPMN Semantics Layer 230, the BPM Infrastructure Layer 220 further provides for a SQLScript table type PARAMETER_TYPE, which accommodates those parameters as collection of key-value pairs. In some embodiments, a corresponding procedure DECODE_PARAMETERS (e.g., SQLScript procedure) dynamically produces an instance of that table type by parsing an URL-encoded parameter string, according to the following example pseudo code portion:

```
CREATE TYPE "BPM"."PARAMETER_TYPE" AS TABLE (
    "NAME" VARCHAR(50) PRIMARY KEY,
    "VALUE" VARCHAR(100)
);
CREATE PROCEDURE "BPM"."DECODE_PARAMETERS" (
    IN parameterString VARCHAR(1000),
    OUT parameterTable
    "BPM"."PARAMETER_TYPE")
LANGUAGE SQLSCRIPT AS
ampersandPosition INTEGER := 0;
equalsPosition INTEGER := 0;
parameterName VARCHAR(50) := NULL;
parameterValue VARCHAR(100) := NULL;
BEGIN
    WHILE (parameterString IS NOT NULL) DO
        SELECT
            LOCATE(parameterString, '='),
            LOCATE(parameterString, '&')
            INTO equalsPosition, ampersandPosition
        FROM "SYS"."DUMMY";
        IF (equalsPosition > 0) THEN
            SELECT
                SUBSTRING(parameterString, 1,
                equalsPosition-1) INTO
parameterName
            FROM "SYS"."DUMMY";
            IF (ampersandPosition > 0) THEN
                SELECT
                    SUBSTRING(parameterString,
                    equalsPosition+1,
ampersandPosition-equalsPosition-1),
                    SUBSTRING(parameterString,
                    ampersandPosition+1)
                    INTO parameterValue, parameterString
                FROM "SYS"."DUMMY";
            ELSE
                SELECT
                    SUBSTRING(parameterString,
                    equalsPosition+1), NULL
                    INTO parameterValue, parameterString
                FROM "SYS"."DUMMY";
            END IF;
            parameterTable = SELECT
                TO_CHAR(:parameterName) AS "NAME",
                TO_CHAR(:parameterValue) AS "VALUE"
                FROM "SYS"."DUMMY" UNION ALL
                SELECT "NAME", "VALUE" FROM
                :parameterTable;
```

```
        ELSE
            BREAK;
        END IF;
    END WHILE;
END;
```

In some embodiments, the PARAMETER_TYPE table type and DECODE_PARAMETERS convenience procedure may work around SQLScript's support for tables only (apart from primitive data types such as integer, string, etc.). Parameters to a procedure of the BPMN Semantics Layer 230 may be given by a table instance of type PARAMETER_TYPE. The DECODE_PARAMETERS procedure may parse a URL-encoded string into the table instance of type PARAMETER_TYPE.

The BPM Infrastructure Layer 220 may also provide for support functionality to facilitate correctly prioritized de-queuing of ready-to-execute process steps from the view in the Process Execution Layer 240. That may include, for instance, a table type for QUEUE_TYPE that acts as an abstraction of the individual process step queues in the Process Execution Layer 240, according to the following example pseudo code portion:

```
CREATE TYPE "BPM"."QUEUE_TYPE" AS TABLE (
    "ENQUEUE_TIME" TIMESTAMP,
    "PRIORITY" TINYINT,
    "PROCESS_ID" INTEGER,
    "ARTIFACT_NAME" VARCHAR(100),
    "PROCEDURE_ARGUMENTS" VARCHAR(1000)
);
```

A NEXT_TRANSITION procedure may retrieve a "ready" process step from a given queue, obeying priority ordering and "first-in-first-out," or FIFO-style de-queueing, according to the following example pseudo code portion:

```
CREATE PROCEDURE "BPM"."NEXT_TRANSITION" (
    IN queue "BPM"."QUEUE_TYPE",
    OUT processId INTEGER,
    OUT artifactName VARCHAR(100),
    OUT procedureArguments VARCHAR(1000))
LANGUAGE SQLSCRIPT AS
BEGIN
    SELECT COUNT(*), -1, '', ''
        INTO hasTransition, processId, artifactName,
        procedureArguments
    FROM :queue;
    IF (hasTransition > 0) THEN
        SELECT TOP 1
            IFNULL("PROCESS_ID", -1),
            IFNULL("ARTIFACT_NAME", ''),
            IFNULL("PROCEDURE_ARGUMENTS", '')
            INTO processId, artifactName, procedureArguments
        FROM :queue ORDER BY "ENQUEUE_TIME" ASC,
            "PRIORITY" ASC;
    END IF;
END;
```

Turning to the BPMN Semantics Layer 230, as illustrated, this layer includes procedures 235 (e.g., SQLScript procedures) for BPMN artifacts such as various types of events, activities, and gateways. The illustrated BPMN Semantics Layer 230 may define the procedures that correspond to the baseline control flow artifacts, for example: start and end events (instance lifecycle), various types of gateways (e.g., conditionals, concurrency, synchronization), basic activities (e.g., updating business objects (and other business data) stored in the database), and sub-process invocation and completion (e.g., process aggregation and structuring). The procedures 235 described below may capture the "action" part of various BPMN artifacts (i.e., what is done when that artifact gets executed). Such procedures 235 (e.g., SQLScript procedures) may be called in the course of process execution as done as part of the Process Execution Layer 240. In other words, those procedures 235 make certain implicit contextual assumptions in the particular situation which they are being called.

Such assumptions, in some embodiments, may be validated and/or established during process execution. For instance, the procedure 235 for some plain activity assumes a process and a token (i.e., data structures 225) exist and assumes that the token is at the right position within its process (i.e., in front of the activity). Violating such assumptions at runtime may result in the process being aborted. Further, violating such assumptions may yield a semantic inconsistency in any case such that any party calling these procedures needs to stringently care about said contextual assumptions. For example, in some embodiments, procedures from the BPMN Semantics Layer 230 may only be called from the Process Execution Layer 240.

Making contextual assumptions external to a standard library of the procedures 235 (e.g., SQLScript procedures) may be justified by making process model "deployables" more compact. For example, such compact process model deployables may be reusable (e.g., consume reusable functionality of the BPMN semantics and BPM infrastructure layers) and thus may reduce a resource footprint per process model.

In some examples, processes may start at a Start Event entity. In some embodiments, the Start Event entity may be represented by records of an EVENT table from the BPM Infrastructure Layer 220. In such embodiments, events may serve two different purposes: to start a (top-level) process instance; and to invoke a sub-process from some parent process. In the latter case, the sub-process may keep track of its parent process by populating its newly created instance record from the event's DETAILS attribute, according to the following example pseudo code portion:

```
CREATE PROCEDURE "BPMN"."PLAIN_START_EVENT" (
    OUT processId INTEGER,
    IN parameters "BPM"."PARAMETER_TYPE")
LANGUAGE SQLSCRIPT AS
    eventDetails VARCHAR(1000);
    parentTokenIdString VARCHAR(100);
    parentIdString VARCHAR(100);
    modelId BIGINT;
    eventId INTEGER;
    tokenId INTEGER;
    tokenPosition INTEGER;
    hasParent INTEGER := 0;
BEGIN
    SELECT TO_INT("VALUE") INTO eventId
    FROM :parameters WHERE "NAME"='eventId';
    SELECT TO_INT("VALUE") INTO tokenPosition
    FROM :parameters WHERE "NAME"='tokenPosition';
    SELECT "DETAILS" INTO eventDetails
    FROM "BPM"."EVENTS" WHERE "ID"=:eventId;
    DELETE FROM "BPM"."EVENTS" WHERE "ID"=:eventId;
    SELECT "BPM"."PROCESS_IDS".nextVal INTO processId
    FROM "SYS"."DUMMY";
    SELECT "BPM"."TOKEN_IDS".nextVal INTO tokenId
    FROM "SYS"."DUMMY";
    CALL "BPM"."DECODE_PARAMETERS"(:eventDetails,
        eventParameters);
    SELECT TO_BIGINT("VALUE") INTO modelId
    FROM :eventParameters WHERE "NAME"='modelId';
```

```
    SELECT COUNT(*) INTO hasParent
    FROM :eventParameters WHERE "NAME" LIKE 'parent%';
    IF (hasParent = 2) THEN
        SELECT "VALUE" INTO parentIdString
        FROM :eventParameters WHERE "NAME"='parentId';
        SELECT "VALUE" INTO parentTokenIdString
        FROM :eventParameters WHERE
            "NAME"='parentTokenId';
        INSERT INTO "BPM"."PROCESSES"
            ("ID", "MODEL_ID", "PARENT_ID",
            "PARENT_TOKEN_ID", "SUSPENDED")
            VALUES (:processId, :modelId,
                TO_INT(:parentIdString),
TO_INT(:parentTokenIdString), 0);
    ELSE
        INSERT INTO "BPM"."PROCESSES"
            ("ID", "MODEL_ID", "PARENT_ID",
            "PARENT_TOKEN_ID", "SUSPENDED")
            VALUES (:processId, :modelId, NULL, NULL, 0);
    END IF;
    INSERT INTO "BPM"."TOKENS"("ID", "PROCESS_ID",
        "POSITION")
        VALUES (:tokenId, :processId, : tokenPosition);
END;
```

The PLAIN_START_EVENT procedure initially fetches the eventId and tokenPosition from the procedure parameters. Subsequently, it retrieves the DETAILS attribute from the corresponding EVENTS record and deletes that record (i.e., the event is consumed). New identifiers may be retrieved from the corresponding sequences. Next, the eventDetails is parsed into an eventParameters table from which the parentIdString, parentTokenIdString, and modelId attributes are later fetched.

Depending on whether or not the eventParameters table contains references to the parent process and the parent process's token (i.e., this process is started from a parent process or not), the new PROCESSES record may be populated without or with references to its parent process and token, respectively. Next, an initial token is created at the given token position.

An End Event denotes the completion of a process branch or the entire process. That is, a non-terminating end event may destroy a single token, whereas a terminating end event may terminate the entire process instance. In some embodiments, such a difference may be meaningful in non-block-structured process notations (like BPMN) where the control flow can "branch off" into arbitrarily many parallel branches without having to merge these branches back into a single branch. Different tokens may reach their end event at different points in time. Moreover, those different branches may end up in different end events. A token on one of these branches that reaches an end event is normally not expected to terminate the entire process (i.e., other tokens may continue to make progress on their branches), according to the following example pseudo code portion:

```
CREATE PROCEDURE "BPMN"."PLAIN_END_EVENT" (
    IN processId INTEGER,
    IN parameters "BPM"."PARAMETER_TYPE"
) LANGUAGE SQLSCRIPT AS
    tokenNumber INTEGER := 0;
    parentId INTEGER := NULL;
    parentTokenId INTEGER := NULL;
    modelId BIGINT;
BEGIN
    DELETE FROM "BPM"."TOKENS" WHERE "ID" = (
        SELECT TO_INT("VALUE") FROM :parameters
        WHERE "NAME"=tokenId');
```

```
    SELECT "PARENT_ID", "PARENT_TOKEN_ID",
        "MODEL_ID"
        INTO parentId, parentTokenId, modelId
        FROM "BPM"."PROCESSES" WHERE "ID"=:processId;
    IF (parentId IS NOT NULL) THEN
        INSERT INTO "BPM"."EVENTS"
            SELECT
                "BPM"."EVENT_IDS".nextVal AS "ID",
                1 AS "FLAVOR",
                'modelId=' || TO_CHAR(modelId) ||
                '&parentId=' ||
TO_CHAR(parentId) || '&parentTokenId=' || TO_CHAR(parentTokenId)
AS "DETAILS"
            FROM "SYS"."DUMMY";
    END IF;
    SELECT COUNT(*) INTO tokenNumber
        FROM "BPM"."TOKENS" WHERE
        "PROCESS_ID"=:processId;
    IF (tokenNumber = 0) THEN
        DELETE FROM "BPM"."PROCESSES" WHERE
            "ID" = :processId;
    END IF;
END;
```

Specifically, in some embodiments, the procedure PLAIN_END_EVENT initially removes the record identified by the given tokenId parameter from the TOKENS table. If this process instance was started as a sub-process of some parent process, an event denoting the triggering of the end event (i.e., to continue the parent process instance) may be generated. Next, a one-step process termination may be performed to optionally remove the corresponding process instance (i.e., record) within this procedure (if there are no further tokens for this process i.e., the process instance can be safely destructed).

Conversely, the terminating end event may instantaneously terminate the entire process instance, including all tokens and sub-processes (if any). For example, after a token has triggered a terminating end event, no other tokens (on whatever branch) and no sub-processes (or transitively: sub-processes of sub-processes, etc.) may continue to make progress after the procedure has completed, according to the following example pseudo code portion:

```
CREATE PROCEDURE
"BPMN"."TERMINATING_END_EVENT" (
    IN processId INTEGER,
    IN parameters "BPM"."PARAMETER_TYPE"
) LANGUAGE SQLSCRIPT AS
    parentId INTEGER := NULL;
    parentTokenId INTEGER := NULL;
    modelId BIGINT;
BEGIN
    SELECT "PARENT_ID", "PARENT_TOKEN_ID",
        "MODEL_ID"
        INTO parentId, parentTokenId, modelId
        FROM "BPM"."PROCESSES" WHERE "ID"=:processId;
    IF (parentId IS NOT NULL) THEN
        INSERT INTO "BPM"."EVENTS"
            SELECT
                "BPM"."EVENT_IDS".nextVal AS "ID",
                1 AS "FLAVOR",
                'modelId=' || TO_CHAR(modelId) ||
                '&parentId=' ||
TO_CHAR(parentId) || '&parentTokenId=' || TO_CHAR(parentTokenId)
AS "DETAILS"
            FROM "SYS"."DUMMY";
```

-continued

```
    END IF;
    DELETE FROM "BPM"."TOKENS" WHERE
        "PROCESS_ID" = :processId;
    CALL "BPMN"."CLEANUP_INSTANCE"(processId);
END;
```

As with non-terminating end events, a check of whether the process instance was launched as a sub-process may be performed. If so, an event record with the corresponding meta data is created. Next, the token that had triggered the end event may be destroyed and another procedure CLEANUP_INSTANCE (e.g., SQLScript procedure) may be called, according to the following example pseudo code portion:

```
CREATE PROCEDURE "BPMN"."CLEANUP_INSTANCE" (
    IN processId INT)
LANGUAGE SQLSCRIPT AS
    currentChildProcessNumber INTEGER := 0;
    updatedChildProcessNumber INTEGER := 0;
BEGIN
    DELETE FROM "BPM"."PROCESSES" WHERE "ID" =
    :processId;
    childProcesses =
        SELECT "ID" FROM "BPM"."PROCESSES" WHERE
        "PARENT_ID" = :processId;
    SELECT COUNT(*) INTO updatedChildProcessNumber FROM
    :childProcesses;
    WHILE
    (currentChildProcessNumber<updatedChildProcessNumber) DO
        SELECT currentChildProcessNumber INTO
        updatedChildProcessNumber
        FROM "SYS"."DUMMY";
        childProcesses =
            SELECT "ID" FROM :childProcesses UNION
            SELECT "ID" FROM "BPM"."PROCESSES"
            WHERE "PARENT_ID" IN (
                SELECT "ID" FROM :childProcesses);
        SELECT COUNT(*) INTO updatedChildProcessNumber
        FROM
:childProcesses;
    END WHILE;
    DELETE FROM "BPM"."TOKENS" WHERE
        "PROCESS_ID" IN (
            SELECT "ID" FROM :childProcesses);
    DELETE FROM "BPM"."PROCESSES" WHERE "ID" IN (
            SELECT "ID" FROM :childProcesses);
END;
```

Terminating a process instance entails removing all of its tokens and all of its sub-process instances. In some embodiments, determining the nesting depth of sub-processes may be determined dynamically. To do so, the CLEANUP_INSTANCE procedure employs a loop which progressively extends a dynamically populated table childProcesses by adding further process identifiers whose parent process is already stored in childProcesses. For example, the "transitive hull" of the parent-child process relationship is determined. Once the childProcesses table does not grow any further, it may be assumed that all (transitive) child processes have been found. Then the process may first remove all tokens associated to any of the contained process instances and ultimately, remove the child process instances.

BPMN provides for re-using existing process building blocks by means of a sub-process invocation feature. Apart from that re-use aspect, process models may reduce complexity by hiding well-encapsulated details in expandable process steps. For example, a (sub-) process can be invoked from some parent process and the parent process may be signaled of the sub-process's completion. As (sub-) processes rely on an event-based (loose coupling) mechanism for its invocation and completion, the parent process needs to generate and consume said events, respectively. Favoring loose coupling over static (compile-time) invocation of sub-processes may facilitate that mechanism for advanced process lifecycle features such as patch-ability (where an existing sub-process is swapped against a renewed version, automatically affecting any parent process) and extensibility. In some embodiments, enterprise clients or users may define "extensions" (e.g., custom functionality expressed as process fragments) and plug these into existing sub-process invocations (acting as "extension points"), according to the following example pseudo code portion:

```
CREATE PROCEDURE "BPMN"."START_SUBFLOW" (
    IN processId INTEGER,
    IN parameters "BPM"."PARAMETER_TYPE"
) LANGUAGE SQLSCRIPT AS
    tokenId INTEGER;
BEGIN
    SELECT TO_INTEGER("VALUE") INTO tokenId
    FROM :parameters WHERE "NAME" ='tokenId';
    SELECT "VALUE" INTO modelId FROM :parameters
    WHERE "NAME" ='modelId';
    INSERT INTO "BPM"."EVENTS" (
        SELECT
            "BPM"."EVENT_IDS".nextVal AS "ID",
            0 AS "FLAVOR",
            'modelId=' || modelId || '&parentId=' ||
            TO_CHAR(processId) ||
'&parentTokenId=' || TO_CHAR(tokenId) AS "DETAILS"
            FROM "SYS"."DUMMY");
    UPDATE "BPM"."TOKENS" SET "POSITION" = (
        SELECT TO_INTEGER("VALUE")
        FROM :parameters WHERE "NAME"='tokenPosition')
    WHERE "ID" = tokenId;
    EXEC 'CALL "' || modelId || '"."SCHEDULER"( )';
END;
```

The START_SUBFLOW procedure corresponds to BPMN's Call Activity where an EVENTS record is generated, encoding the to-be-started sub-process and a back-reference to the parent process in a URL-encoded parameter string that gets stored in the DETAILS attribute. The parent process's token may be put into a "waiting" position which denotes a sub-process currently executing. To make sure the sub-process (which resides in a different of the several Process Execution Layers 240) picks up the event and executes its process steps, its SCHEDULER procedure may be launched (as described below). As the concrete schema name (represented by the model identifier) is abstracted, dynamic SQL, for example, may be used to assemble the procedure call dynamically. Once the sub-process runs into an end event, it may generate another EVENTS record, which is consumed in an END_SUBFLOW procedure where the parent process's token is put to behind the Call Activity, according to the following example pseudo code portion:

```
CREATE PROCEDURE "BPMN"."END_SUBFLOW" (
    IN processId INTEGER,
    IN parameters "BPM"."PARAMETER_TYPE"
) LANGUAGE SQLSCRIPT AS
BEGIN
    DELETE FROM "BPM"."EVENTS" WHERE "ID" IN (
        SELECT TO_INTEGER("VALUE")
        FROM :parameters WHERE "NAME"='eventId');
    UPDATE "BPM"."TOKENS"
    SET "POSITION" = (
        SELECT TO_INTEGER("VALUE")
        FROM :parameters WHERE "NAME"='tokenPosition')
```

```
        WHERE "ID" = (
            SELECT TO_INTEGER("VALUE")
            FROM :parameters WHERE "NAME"='tokenId');
END;
```

Business processes often alter their course of execution depending on some condition being met. Various types of gateways re-direct tokens to selected outbound branch(es) as a result to dynamically evaluating conditions atop the process data context. Traditionally, processes host a dedicated data context, made up from a range of explicitly modeled data objects, which are owned by the process and exclusively populated by steps of a particular process instance (i.e., each process instance gets its own set of data objects which are not within reach from other process instances). For a business process being embedded into the in-memory database 205, the concept of a process-centric data context may be counter-intuitive and contradicts the general notion of database artifacts whose lifecycle is governed by DDL (data definition language) statements and that are subject to the database's native authorization mechanism. Thus, a process-owned data context may be removed and the entire database is considered as a state that can be manipulated and queried by process steps. That includes process routing conditions used in decision gateways, which map to database queries, resulting in a "truth" or "false" (or near truth or near false) result.

In some embodiments, there may be two types of decision gateways, being BPMN's Exclusive and Inclusive (Split) Gateways (i.e., XOR Split and OR Split). Corresponding merge gateways are addressed below (i.e., Inclusive Gateway, or OR Join) or correspond to a no-op action (i.e., Exclusive Gateway, or XOR Join) that is dealt with in a compiler 265, which generates the artifacts in the Process Execution Layer 240.

Decision gateways may assume their outbound edges to be equipped with conditions that can be evaluated at runtime. XOR split and OR split differ by performing an exclusive 1-out-of-M and inclusive N-out-of-M decision as to which outbound branch(es) is (are) activated (i.e., get(s) a token passed to), based on branch conditions being "true" or "false." That is, XOR splits evaluate their outbound branches' conditions in a deterministic order. The first branch whose condition evaluates to "true" will be activated. If none of the conditions yields "true," a mandatory "default branch" (which does not have a condition associated) is activated instead, according to the following example pseudo code portion:

```
CREATE PROCEDURE "BPMN"."XOR_SPLIT" (
    IN processId INTEGER,
    IN parameters "BPM"."PARAMETER_TYPE"
) LANGUAGE SQLSCRIPT AS
    conditionResult INTEGER := 0;
    tokenPosition INTEGER;
    CURSOR branchCursor(parameters
        "BPM"."PARAMETER_TYPE") FOR
        SELECT
            TO_INTEGER(SUBSTR_BEFORE("VALUE",':')) AS
            "CONDITION_RESULT",
            TO_INTEGER(SUBSTR_AFTER("VALUE",':')) AS
            "TOKEN_POSITION"
            FROM :parameters WHERE "NAME" LIKE 'branch%'
            ORDER BY "NAME";
BEGIN
    OPEN branchCursor(:parameters);
    FETCH branchCursor INTO conditionResult, tokenPosition;
    WHILE (NOT branchCursor::NOTFOUND AND
        conditionResult=0) DO
        FETCH branchCursor INTO conditionResult, tokenPosition;
    END WHILE;
    IF (conditionResult=0) THEN
        UPDATE "BPM"."TOKENS" SET "POSITION"=(
            SELECT TO_INTEGER("VALUE") FROM :parameters
            WHERE "NAME"='defaultPosition')
        WHERE "ID" IN (
            SELECT TO_INTEGER("VALUE")
            FROM :parameters WHERE "NAME"='tokenId');
    ELSE
        UPDATE "BPM"."TOKENS" SET "POSITION" =
        tokenPosition
            WHERE "ID" IN (
                SELECT TO_INTEGER("VALUE")
                FROM :parameters WHERE "NAME"='tokenId');
    END IF;
    CLOSE branchCursor;
END;
```

Specifically, the procedure expects the branch conditions' results to be passed in. It iterates over these results and stops as soon as a "true" result is found. If none is found (i.e., after iterating over all branches, the conditionResult variable is still 0 equals "false"), the token is passed to the default branch. Otherwise, it is put to the first branch whose conditionResult was "true" (different from 0).

Conversely, an OR split may activate multiple outbound branches and needs to check all of their conditions. For any condition that evaluates to "true", it passes a token to the corresponding branch. If ultimately, none of the branch conditions has evaluated to "true", the default branch is activated (gets a token passed to), according to the following example pseudo code portion:

```
CREATE PROCEDURE "BPMN"."OR_SPLIT" (
    IN processId INTEGER,
    IN parameters "BPM"."PARAMETER_TYPE"
) LANGUAGE SQLSCRIPT AS
    triggeredBranchesNumber INTEGER := 0;
    CURSOR branchCursor(parameters
    "BPM"."PARAMETER_TYPE") FOR
        SELECT
            TO_INTEGER(SUBSTR_BEFORE("VALUE",':'))
            AS "CONDITION_RESULT",
            TO_INTEGER(SUBSTR_AFTER("VALUE",':'))
            AS "TOKEN_POSITION"
            FROM :parameters WHERE "NAME" LIKE 'branch%';
BEGIN
    FOR currentRow AS branchCursor(:parameters) DO
        IF (currentRow."CONDITION_RESULT" <> 0) THEN
            SELECT triggeredBranchesNumber+1 INTO
            triggeredBranchesNumber
            FROM "SYS"."DUMMY";
            INSERT INTO "BPM"."TOKENS"
                SELECT
                    "BPM"."TOKEN_IDS".nextVal AS "ID",
                    :processId AS "PROCESS_ID" ,
                    currentRow."TOKEN_POSITION" AS
                    "POSITION"
                FROM "SYS"."DUMMY";
        END IF;
    END FOR;
    IF (triggeredBranchesNumber<>0) THEN
        DELETE FROM "BPM"."TOKENS" WHERE "ID" IN (
            SELECT TO_INTEGER("VALUE") FROM
            :parameters WHERE
"NAME"='tokenId');
    ELSE
        UPDATE "BPM"."TOKENS"
            SET "POSITION"=(
                SELECT TO_INTEGER("VALUE") FROM
                :parameters
                WHERE "NAME"='defaultPosition')
            WHERE "ID" IN (
```

```
            SELECT TO_INTEGER("VALUE") FROM
            :parameters
            WHERE "NAME"='tokenId');
    END IF;
END;
```

In some embodiments using SQLScript procedures, a SQLScript convenience feature of iterating over a cursor in a for-loop (without the overhead of opening/closing the cursor and recurrently fetching tuples from it) may be used. The number of branches evaluated to "true" (CONDITION_RESULT not 0) is tracked in an zero-initialized integer variable triggeredBranchesNumber, which is incremented by 1 for each "truthy" condition result. Further, OR split gateways actually perform both conditionally routing tokens to some branch(es) and forking parallel flow (e.g., by activating multiple branches whose condition evaluates to "true"). In some cases, it is not known at design time which and how many branches get activated by an OR split gateway such that one faces the challenge of dynamically synchronizing that parallel flow somewhere downstream in that process. To do so, OR join gateways may be used.

To enhance a process's throughput and to de-couple mutually independent process steps, parallelism may be employed. That is, multiple tokens may simultaneously make progress in one and the same process instance. In some embodiments, those tokens may reside on different process branches to whom they get passed by dedicated gateways such as Parallel (Split) Gateways and Inclusive (Split) Gateways (e.g., AND Split and OR Split, respectively). AND splits may constitute a simplified variant of OR splits, which unconditionally pass a token to all outbound branches. That is to say, the parallel "branch-out" is statically fixed in a process model (by the number of outbound branches that an AND split possesses). For the sake of better reuse though, the standard AND split implementation may be generalized to cope with arbitrarily many parallel branches. These branches must be passed in by specifying the initial token positions for each outbound branch, according to the following example pseudo code portion:

```
CREATE PROCEDURE "BPMN"."AND_SPLIT" (
    IN processId INTEGER,
    IN parameters "BPM"."PARAMETER_TYPE"
) LANGUAGE SQLSCRIPT AS
    CURSOR tokenCursor(parameters
    "BPM"."PARAMETER_TYPE") FOR
        SELECT TO_INTEGER("VALUE") AS
        "TOKEN_POSITION"
        FROM :parameters WHERE "NAME" LIKE
        'tokenPosition%';
BEGIN
    FOR currentRow AS tokenCursor(:parameters) DO
        INSERT INTO "BPM"."TOKENS"
            SELECT
                "BPM"."TOKEN_IDS".nextVal AS "ID",
                processId AS "PROCESS_ID",
                currentRow."TOKEN_POSITION" AS
                "POSITION"
            FROM "SYS"."DUMMY";
    END FOR;
    DELETE FROM "BPM"."TOKENS" WHERE "ID" = (
        SELECT TO_INTEGER("VALUE") FROM :parameters
        WHERE
"NAME"='tokenId');
    END;
```

The AND_SPLIT procedure iterates over all parameters prefixed by "tokenPosition" and creates new tokens for these (inserts new records into the TOKENS table). Once done, it may removes the token that has triggered the gateway. In some alternative embodiments, that original token may be re-used and passed to one of the gateway's outbound branches (e.g., instead of creating a new one). As processes should not make any assumptions on a token's identity, both variants are semantically equivalent.

Conversely, an AND join gateway merges and synchronizes parallel flow by consuming tokens from its inbound branches and producing a single token for its outbound branch, according to the following example pseudo code portion:

```
CREATE PROCEDURE "BPMN"."AND_JOIN" (
    IN processId INTEGER,
    IN parameters "BPM"."PARAMETER_TYPE"
) LANGUAGE SQLSCRIPT AS
    CURSOR tokenCursor(parameters "BPM"."PARAMETER_TYPE")
    FOR
        SELECT TO_INTEGER("VALUE") AS "TOKEN_ID"
        FROM :parameters WHERE "NAME" LIKE 'tokenId%';
BEGIN
    FOR currentRow AS tokenCursor(:parameters) DO
        DELETE FROM "BPM"."TOKENS" WHERE "ID" =
        currentRow."TOKEN_ID";
    END FOR;
    INSERT INTO "BPM"."TOKENS"
        SELECT
            "BPM"."TOKEN_IDS".nextVal AS "ID",
            :processId AS "PROCESS_ID",
            TO_INTEGER("VALUE") AS "POSITION"
        FROM :parameters WHERE "NAME" = 'tokenPosition';
END;
```

Certain embodiments may provide for reuse in different scenarios such that the token identities (the primary keys of the corresponding TOKENS records) must be passed in as parameters prefixed by "tokenId." That requirement allows for the AND_JOIN procedure for AND join gateways to have different numbers of inbound branches and further makes it possible to use it for OR join gateways, which do not require a separate standard library procedure.

Apart from their structure, business processes may differentiate what the contained activities actually do. BPMN provides for several activities performing different types of "work." That includes Call Activities for starting sub-processes and invoking other (external) services, User Tasks for human-driven process steps, Script Tasks for user-defined scripted actions, Business Rule Tasks for invoking pre-defined business. evaluating pre-defined business rules, and others.

Script Tasks and Business Rule Tasks, for example, can both be addressed with the in-memory database programming model, for example, through SQLScript, for Script Tasks and the Business Function Library for Business Rule Tasks. Much of the customization for activities (of whatever type) may be done with data mappings, which manipulate the process data context. Data mappings (i.e., manipulating database state) may be an integral part of the custom scripts and business rules a user provides for those activities. Such user extensions may be part of a concrete process model and may not belong into a BPMN standard library. Instead, the BPMN Semantics Layer 230 may provide for a plain activity implementation that merely updates the token position. The Process Execution Layer 240 would provide for custom wrapper procedures triggering the user extensions and calling the PLAIN_ACTIVITY procedure from there, according to the following example pseudo code portion:

```
CREATE PROCEDURE "BPMN"."PLAIN_ACTIVITY" (
    IN processId INTEGER,
    IN parameters "BPM"."PARAMETER_TYPE"
) LANGUAGE SQLSCRIPT AS
BEGIN
    UPDATE "BPM"."TOKENS"
        SET "POSITION" = (
            SELECT TO_INTEGER("VALUE")
            FROM :parameters WHERE "NAME"='tokenPosition')
        WHERE "ID" = (
            SELECT TO_INTEGER("VALUE")
            FROM :parameters WHERE "NAME"='tokenId');
END;
```

The Process Execution Layer 240 represents a specific process model, e.g., each process model yields its own Process Execution Layer 240. Specifically, the compiler 265 may bridge the gap between the process modeling language (e.g., BPMN 2.0) and its executable representation atop the in-memory database 205 (e.g., SQL and SQLScript).

In the illustrated embodiment, the Process Execution Layer 240 includes four parts. First, a queue view definition 245 accommodates the contextual conditions for each process step to be triggered. As such, it may take the state of the control flow (e.g., token positions, process suspension, etc.) into account. Other than that, the queue view definition 245 may further evaluate branch conditions and prepare, for example, SQLScript arguments, for calling the procedures of the BPMN Semantics Layer 230 with the custom contextual arguments.

Second, a scheduler 250 (e.g., Scheduler SQLScript procedure) polls the queue view definition 245 for ready-to-be-executed procedures, such as SQLScript procedures. This includes fetching and parsing the corresponding parameters, and ultimately executing the SQLScript procedure.

Third and optionally, custom procedures (e.g., SQLScript) and other database entities (such as tables, views, etc.) 255, which extend the standard library functionality from the BPMN Semantics Layer 230 may be included in the Process Execution Layer 250.

Fourth, a process API 260, made up from a number of procedures (e.g., SQLScript), which perform basic interactions with processes, is included in the illustrated embodiment. Such interactions may include, for example, to launch a new instance, monitor processes, abort processes, etc.

In some embodiments, the BPMS runtime 200 layered on the in-memory database 205 may follow a rule-driven approach in which each process step is guarded by a rule, specifying its contextual conditions. Such conditions may define when some process step is ready to be executed. It may refer to the state of the process (in particular the position of its tokens) and also incorporate other predicates (like routing conditions for decision gateways). Further, the conditions also need to calculate the parameters that are fed into some procedure. For instance, many procedures may require the token identity (i.e., the primary key of a record in the TOKENS table) and the position to which the token shall be set when completing the process step to be passed in. As the number and type of parameters varies for different process steps, the view condition merely assembles a URL-encoded string which is later parsed by the scheduler 250 (e.g., calling the DECODE_PARAMETERS procedure from the BPM Infrastructure layer) and passed into the procedures 235 (as the parameters argument).

At any point in time, there may be multiple running process instances (that correspond to one and the same Process Execution Layer 240) where each process instance may further make progress with multiple tokens such that a number of process steps may be "ready" for execution. For example, the individual rules (representing the contextual assumptions of the process steps) may be assembled into a single queue view definition 245 (e.g., named QUEUE). That view can be queried for ready-to-run process steps, represented by a tuple that (among other data) refers to the affected process instance, a logical name of the artifact, and custom (e.g., string-encoded) arguments to a procedure 235 (e.g., SQLScript) that performs the corresponding business logics. Generally, that queue view definition 245 is defined as follows, according to the following example pseudo code portion:

```
CREATE VIEW "MYPROCESS"."QUEUE" ("ENQUEUE_TIME",
"PRIORITY", "PROCESS_ID", "ARTIFACT_NAME",
"PROCEDURE_ARGUMENTS") AS
    -- sub-query for process step 1
    UNION
    -- sub-query for process step 2
    UNION
    ...
    UNION
    -- sub-query for process step N
```

Each process step is represented by a sub-query that (1) constructs or queries the attribute values for the aforementioned tuple; and (2) makes sure to only yield a non-empty result set when the step's contextual conditions are met. All sub-queries are connected by a "union" operator such that the queue view definition 245 may, in total, represent multiple ready-to-run process steps.

Start events may require an event instance to occur, represented by a record in the EVENTS table. That event may further need to have a certain integer-encoded "flavor" and need to reference the right process model identifier to launch an instance of this particular process model according to the following example pseudo code portion:

```
SELECT
    NOW( ) AS "ENQUEUE_TIME",
    0 AS PRIORITY,
    NULL AS "PROCESS_ID",
    'START_EVENT' AS "ARTIFACT_NAME",
    'eventId=' || e."ID" || '&tokenPosition=0' AS
    "PROCEDURE_ARGUMENTS"
FROM "BPM"."EVENTS" e
WHERE e."FLAVOR"=0 AND e."DETAILS" LIKE
    '%modelId=MYPROCESS%'
```

As illustrated, a check for the process instance as referring to the right model (by means of the MODEL_ID attribute in the PROCESSES table) is conducted in this example. Making said check part of the query may be helpful to isolate processes from one another and avoid process instances and tokens that belong to some other process model to trigger that rule.

Calling sub-processes and resuming a parent process after a sub-process's completion may follow a loose coupling approach. Specifically, the parent process and its child process communicate by means of events, represented by records of the EVENTS table. Those events may specify what to do (e.g., launch a sub-process or continue the parent process) and transport further metadata between the two processes (such as the identity of the parent process and the token that has triggered the sub-process activity), according to the following example pseudo code portion.

```
SELECT
    NOW( ) AS "ENQUEUE_TIME",
    0 AS PRIORITY,
    p."ID" AS "PROCESS_ID",
    'START_SUBFLOW' AS "ARTIFACT_NAME",
    'tokenId=' || t."ID" ||
    '&tokenPosition=1&modelId=SOMEPROCESS' AS
"PROCEDURE_ARGUMENTS"
    FROM "BPM"."PROCESSES" p, "BPM"."TOKENS" t
    WHERE p."MODEL_ID" = 'MYPROCESS' AND
    p."SUSPENDED" = 0 AND t."POSITION"
= 0 AND t."PROCESS_ID" = p."ID"
```

A sub-process is launched by specifying the model identifier of the child process and also specifying a token position that represents an intermediate waiting state where the parent process blocks until the child process is complete. The actual procedure for that rule may then re-package those parameters into an event, according to the following example pseudo code portion.

```
SELECT
    NOW( ) AS "ENQUEUE_TIME",
    0 AS PRIORITY,
    p."ID" AS "PROCESS_ID",
    'END_SUBFLOW' AS "ARTIFACT_NAME",
    'tokenId=' || t."ID" || '&tokenPosition=2&eventId=' ||
    e."ID" AS
"PROCEDURE_ARGUMENTS"
    FROM "BPM"."PROCESSES" p, "BPM"."TOKENS" t,
    "BPM"."EVENTS" e
    WHERE p."MODEL_ID" = 'SAMPLE3' AND p."SUSPENDED" =
    0 AND t."POSITION" =
1 AND t."PROCESS_ID" = p."ID" AND e."FLAVOR" = 1 AND
e."DETAILS" LIKE
('%parentId=' || TO_CHAR(p."ID") || '%') AND e."DETAILS" LIKE
('%parentTokenId=' || TO_CHAR(t."ID") || '%')
```

In order for the parent process to continue after the child process was complete, it needs to wait for the completion event (e.g., denoted by a specific event FLAVOR) to occur. That event may also refer to this process instance and the "waiting" token (which also needs to be in the right state).

Dedicated decision gateways route a process flow to different branches. In BPMN, Exclusive Gateways (XOR Splits) perform an exclusive and deterministic choice among multiple outbound branches, each equipped with a branch condition, according to the following example pseudo code portion:

```
SELECT
    NOW( ) AS "ENQUEUE_TIME",
    0 AS PRIORITY,
    p."ID" AS "PROCESS_ID",
    'XOR_SPLIT' AS "ARTIFACT_NAME",
    'tokenId=' || t."ID" || '&defaultPosition=2&branch0=' || (
        SELECT COUNT(*) FROM "SAMPLE2"."CONTEXT"
        WHERE "NAME"='City' AND "VALUE"='Toronto') ||
':1' AS "PROCEDURE_ARGUMENTS"
    FROM "BPM"."PROCESSES" p, "BPM"."TOKENS" t
    WHERE p."MODEL_ID" = 'MYPROCESS' AND
    p."SUSPENDED" = 0 AND t."POSITION"
= 0 AND t."PROCESS_ID" = p."ID"
```

The PROCEDURE_PARAMETERS string accommodates both the token identifier that is to be routed accordingly and for each outbound branch, a colon-separated pair of two integers denoting: (1) the result of evaluating the branch condition (0 indicates "false", any value not 0 indicates "true"); and (2) the initial token position on that branch.

BPMN's Inclusive Gateways (OR Splits) allow for both conditionally redirecting and forking flow at the same time. If more than one of an OR-Split's branch conditions evaluate to "true," they may all receive a token, according to the following example pseudo code portion.

```
SELECT
    NOW( ) AS "ENQUEUE_TIME",
    0 AS PRIORITY,
    p."ID" AS "PROCESS_ID",
    'OR_SPLIT' AS "ARTIFACT_NAME",
    'tokenId=' || t."ID" || '&defaultPosition=2&branch0=' || (
        SELECT COUNT(*) FROM
        "MYPROCESS"."CONTEXT" WHERE
        "NAME"='City' AND
"VALUE"='Toronto') || ':1&branch1=' || (
        SELECT COUNT(*) FROM
        "MYPROCESS"."CONTEXT" WHERE
        "NAME"='City' AND
"VALUE"='New York') || ':4' AS "PROCEDURE_ARGUMENTS"
    FROM "BPM"."PROCESSES" p, "BPM"."TOKENS" t
    WHERE p."MODEL_ID" = 'MYPROCESS' AND
    p."SUSPENDED" = 0 AND t."POSITION"
= 0 AND t."PROCESS_ID" = p."ID"
```

In the example query, whenever two records in some table CONTEXT exist, both records having "City" as their NAME attribute value and "Toronto" and "New York" as their VALUE attribute values, respectively, a separate token will be placed on both outbound branches.

Parallel Gateways facilitate forking and synchronizing parallel flow by producing and consuming multiple tokens at once. The corresponding contextual conditions reflect that fact as follows, according to the following example pseudo code portion:

```
SELECT
    NOW( ) AS "ENQUEUE_TIME",
    0 AS PRIORITY,
    p."ID" AS "PROCESS_ID",
    'AND_SPLIT' AS "ARTIFACT_NAME",
    'tokenId=' || t."ID" ||
    '&tokenPosition0=1&tokenPosition1=2&tokenPosition2=6' AS
"PROCEDURE_ARGUMENTS"
    FROM "BPM"."PROCESSES" p, "BPM"."TOKENS" t
    WHERE p."MODEL_ID" = 'MYPROCESS' AND
    p."SUSPENDED" = 0 AND t."POSITION"
= 0 AND t."PROCESS_ID" = p."ID"
```

The AND split gateway may require a single inbound token to be at the right position (here: 0) and may need to specify (apart from that token's identifier) the initial token positions for its outbound edges (here: 2 and 6). In contrast, the AND join gateway may require multiple tokens to be present and in the right position (here: 3 and 4), according to the following example pseudo code portion:

```
SELECT
    NOW( ) AS "ENQUEUE_TIME" ,
    0 AS PRIORITY,
    p."ID" AS "PROCESS_ID",
    'AND_JOIN' AS "ARTIFACT_NAME",
    'tokenPosition=5&tokenId0=' || t1."ID" || '&tokenId1=' ||
    t2."ID" AS
"PROCEDURE_ARGUMENTS"
    FROM "BPM"."PROCESSES" p, "BPM"."TOKENS" t1,
    "BPM"."TOKENS" t2
    WHERE p."MODEL_ID" = 'MYPROCESS' AND
    p."SUSPENDED" = 0 AND
t1."POSITION" = 3 AND t1."PROCESS_ID" = p."ID" AND
t2."POSITION" = 4 AND
t2."PROCESS_ID" = p."ID"
```

Both tokens may need to belong to the same process instance. Their identifiers are passed to the corresponding procedure 235 (e.g., SQLScript) to facilitate their consumption.

Activities performing user extensions (such as custom scripts or rules) may require a custom procedure to be in place, which performs said logics. Regarding the contextual conditions, those activities may require a token to be in the right position (which gets forwarded to the next downstream position), according to the following example pseudo code portion:

```
SELECT
    NOW( ) AS "ENQUEUE_TIME",
    0 AS PRIORITY,
    p."ID" AS "PROCESS_ID",
    'CUSTOM_ACTIVITY_1' AS "ARTIFACT_NAME",
    'tokenId=' || t."ID" || '&tokenPosition=3' AS
    "PROCEDURE_ARGUMENTS"
    FROM p."MODEL_ID" = 'MYPROCESS' AND
    "BPM"."PROCESSES" p, "BPM"."TOKENS"
t
    WHERE p."SUSPENDED" = 0 AND t."POSITION" = 1 AND
    t."PROCESS_ID" =
p."ID"
```

As illustrated, the custom ARTIFACT_NAME denotes the name of a custom procedure which, in turn, calls the PLAIN_ACTIVITY procedure from the BPMN Semantics Layer 230.

The process scheduler 250, in some embodiments, may be another procedure (e.g., SQLScript) which regularly queries the queue view definition 245 and executes the procedure 235 of the top-most query result, according to the following example pseudo code portion:

```
CREATE PROCEDURE "MYPROCESS"."SCHEDULER" ( ) LANGUAGE SQLSCRIPT AS
    processId INTEGER;
    hasTransition INTEGER;
    artifactName VARCHAR(100);
    procedureParameterString VARCHAR(1000);
BEGIN
    transitionsQueue = SELECT * FROM "SAMPLE2"."QUEUE";
    CALL "BPM"."NEXT_TRANSITION"(:transitionsQueue, hasTransition,
processId, artifactName, procedureParameterString);
        WHILE (hasTransition > 0) DO
            CALL "BPM"."DECODE_PARAMETERS"(procedureParameterString,
procedureParameters);
            IF (artifactName = 'START_EVENT') THEN
                CALL "BPMN"."PLAIN_START_EVENT"(processId, :procedureParameters);
            ELSEIF (artifactName = 'ACTIVITY') THEN
                CALL "BPMN"."PLAIN_ACTIVITY"(:processId, :procedureParameters);
            ELSEIF (artifactName = 'XOR_SPLIT') THEN
                CALL "BPMN"."XOR_SPLIT"(:processId, :procedureParameters);
            ELSEIF (artifactName = 'END_EVENT') THEN
                CALL "BPMN"."PLAIN_END_EVENT"(:processId, :procedureParameters);
            ELSEIF (artifactName = 'CLEANUP_INSTANCE') THEN
                CALL "BPMN"."CLEANUP_INSTANCE"(:processId);
            ELSEIF (artifactName = 'CLEANUP_TOKEN') THEN
                CALL "BPMN"."CLEANUP_TOKEN"(:procedureParameters);
            ELSEIF
                ...
            ELSE
                CALL "BPM"."WRITE_TRACELINE"(processId, 0, 0, 'Unknown artifact
"' || artifactName || '" for process ' || processId || ' with argument(s): "'
|| procedureParameterString || '"', bailing out');
                BREAK;
            END IF;
            CALL "BPM"."WRITE_TRACELINE"(processId, 0, 0, 'Executed "' ||
artifactName || '" for process ' || processId || ' with argument(s):"' ||
procedureParameterString || '"');
            transitionsQueue = SELECT * FROM "MYPROCESS"."QUEUE";
            CALL "BPM"."NEXT_TRANSITION"(:transitionsQueue, hasTransition,
processId, artifactName, procedureParameterString);
        END WHILE;
    END;
```

The procedure also inserts entries into some audit tracing table, which allow for later re-constructing a process's course of operations. Inside the loop which polls the queue view definition 245, a nested if . . . else statement decides upon which procedure to call by means of the artifact name. Those procedures may either be default functionality from the BPMN Semantics Layer 230 or be custom procedures from the Process Execution Layer 240.

Custom procedures may become necessary whenever the BPMN Semantics Layer 230 does not provide for sufficient flexibility to map functionality of the process model at hand to parameter settings for one of the existing procedures. For instance, BPMN's Script Activities let a modeler specify script texts that get executed when the process triggers the corresponding activity. As the PLAIN_ACTIVITY procedure from the BPMN Semantics Layer 230 does not allow for injecting script fragments, a "wrapper" activity may be generated, which runs the custom script, according to the following example pseudo code portion:

```
CREATE PROCEDURE "MYPROCESS"."CUSTOM_SCRIPT" (
    IN processId INT,
    IN procedureParameters BPM.PARAMETER_TYPE)
LANGUAGE SQLSCRIPT AS
    tokenId INT;
    tokenPosition INT;
BEGIN
    SELECT TO_INT(VALUE) INTO tokenId
    FROM :procedureParameters WHERE NAME='tokenId';
    SELECT TO_INT(VALUE) INTO tokenPosition
```

```
    FROM :procedureParameters WHERE NAME='tokenPosition';
    /* custom SQL statements go here */
    CALL BPMN.PLAIN_ACTIVITY(:processId,
        :procedureParameters);
END;
```

Further examples for custom procedures in the scope of a process model may be (1) user-defined business rules which are used within a process's routing conditions, or (2) generally complex statements (e.g., SQL statements) that are to be re-used at various places within a process model.

The Process API 260 includes various procedures (e.g., SQLScript) to interact with a process instance (or multiple instances) and to monitor the course of process execution. In some embodiments, a process start facility may be implemented, which creates the event to launch the process and kicks off the scheduler 250, according to the following example pseudo code portion:

```
CREATE PROCEDURE "MYPROCESS"."START_PROCESS"( )
LANGUAGE SQLSCRIPT AS
BEGIN
    INSERT INTO "BPM"."EVENTS"
        SELECT
            "BPM"."EVENT_IDS".nextVal AS "ID",
            0 AS "FLAVOR",
            'modelId=MYPROCESS' AS "DETAILS"
        FROM "SYS"."DUMMY";
        CALL "MYPROCESS"."SCHEDULER"( );
END;
```

Figure 3:
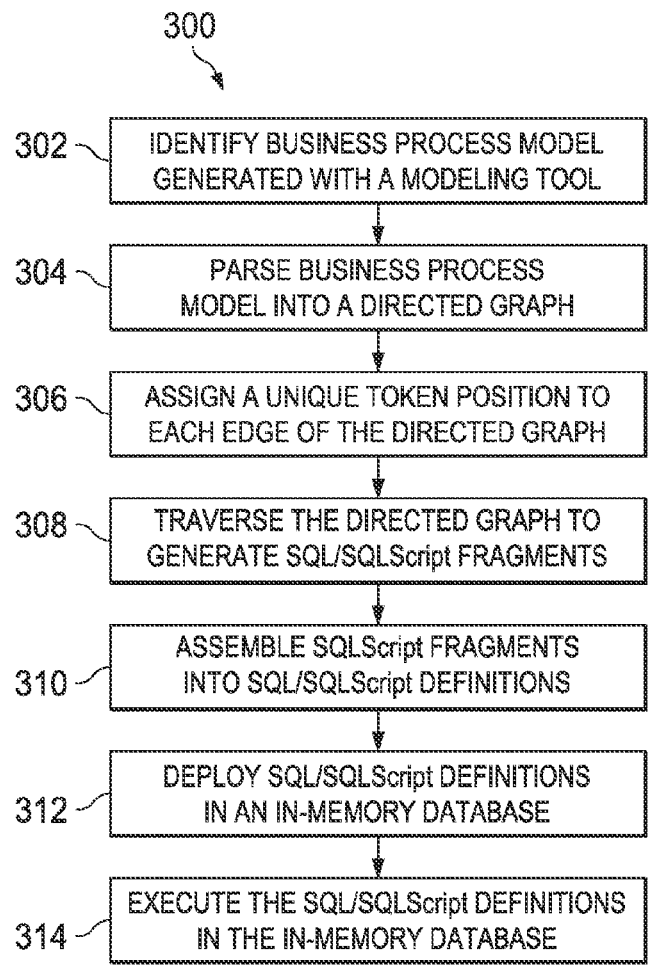
FIG. 3 illustrates an example process implemented with a BPMS runtime layered on an in-memory database.

FIG. 3 illustrates an example process 300 implemented with a BPMS runtime layered on an in-memory database, such as, for example, the BPMS runtime 145 or 200 layered on the in-memory database 135 or 205, respectively. Method 300 may begin at step 302, when a business process model generated with a modeling tool is identified. In some embodiments, the process model is defined in a particular format, such as BPMN 2.0 exchange format. An input file representing the process model in such a format may be XML-based.

Figure 5:
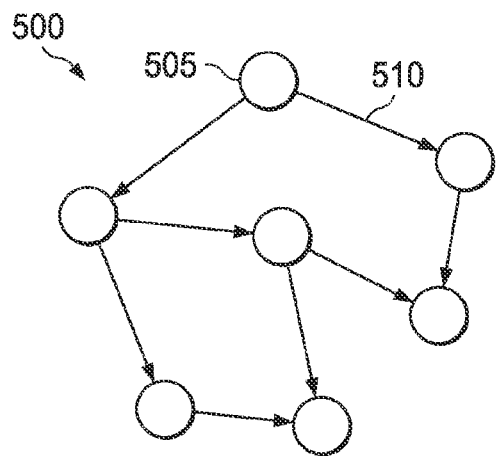
FIG. 5 illustrates an example directed graph.

The business process model may be transformed from the BPMN 2.0 format to, for example, SQL/SQLScript definitions, for example by a compiler. For example, in step 304, the compiler may parse the business process model into a directed graph having typed nodes and edges, where any process step becomes a node and any control flow connector becomes an edge, connecting two nodes. For instance, an example directed graph 500 with nodes 505 and edges 510 is illustrated in FIG. 5.

In step 306, the compiler may assign a unique token (e.g., a BPM data structure) to each of the edges in the directed graph. In step 308, the compiler may traverse the directed graph to generate SQL/SQLScript fragments. For example, in some embodiments, each node defines a process step and each edge defines a control flow connector. The compiler may generate the fragments such that each SQL/SQLScript fragment defines at least a queue sub-query of a particular node (i.e., particular process step). Further, in some embodiments, each SQL/SQLScript fragment may define one or more custom (e.g., user defined) SQLScript procedures.

In step 310, the generated SQL/SQLScript fragments may be assembled into SQL/SQLScript definitions. For example, in some embodiments, the SQL/SQLScript definitions may include a queue SQL view definition, a scheduler SQLScript procedure definition, and a process API (as described above with reference to FIG. 2)

In step 312, the SQL/SQLScript definitions are deployed to the in-memory database. In step 314, the SQL/SQLScript definitions are executed by the in-memory database based on, for instance, a query for data stored in the in-memory database by a business application.

Figure 4:
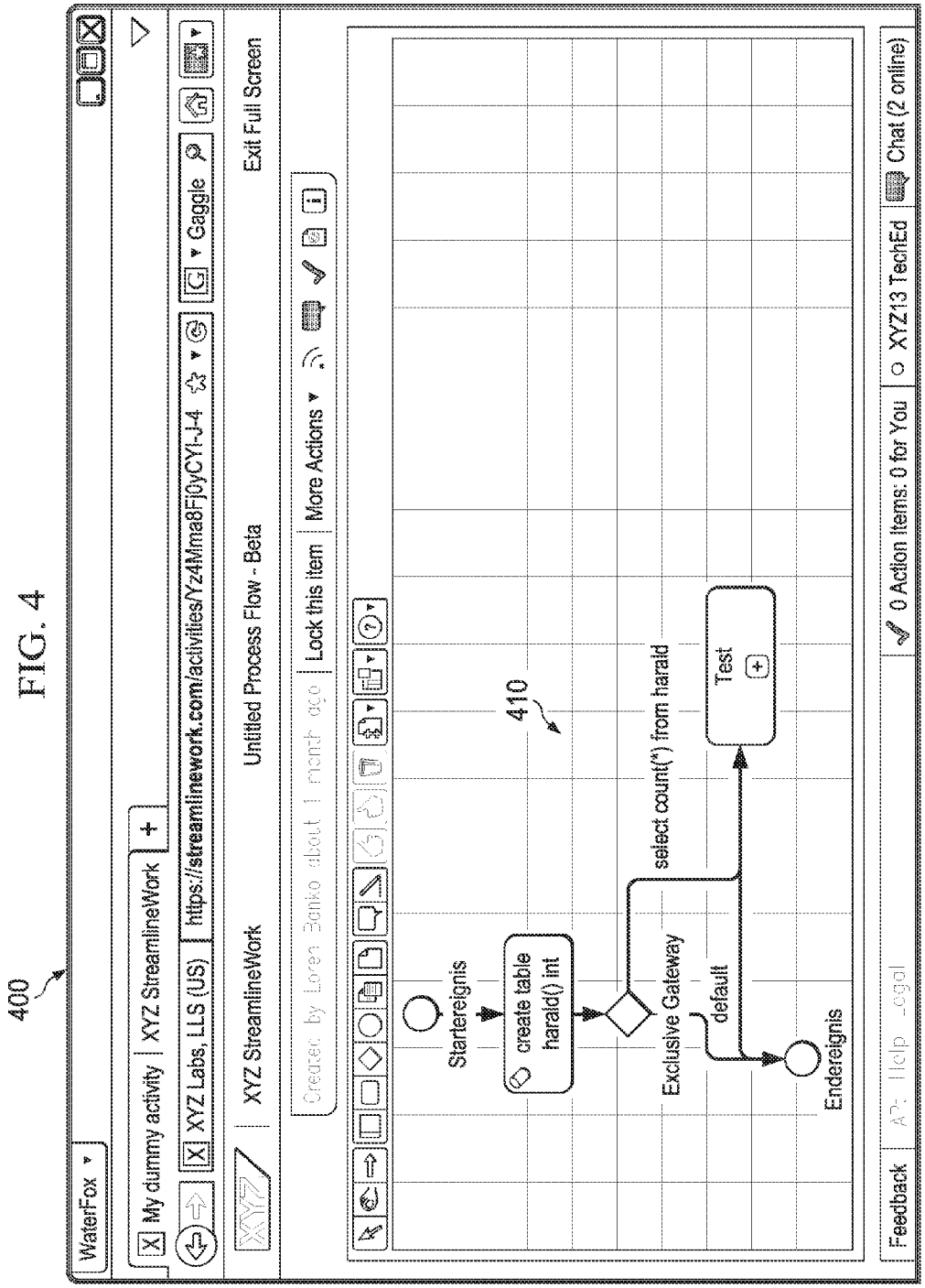
FIG. 4 illustrates an example modeling application that may be used to implement a process model.

FIG. 4 illustrates an example modeling application 400 that may be used to implement a process model 410. In some embodiments, the modeling application 400 (e.g., the Gravity modeling tool produced by SAP AG) may provide a user-friendly interface and tool to model a particular business process while minimizing the requisite technical knowledge. For example, the modeling application 400 may be designed for business user with little or no technical knowledge to produce a business process model in, for example, an XML-based BPMN 2.0 exchange format.

A number of implementations have been described. Nevertheless, it will be understood that various modifications can be made. For example, other methods described herein besides those, or in addition to those, illustrated in FIG. 3 can be performed. Further, the illustrated steps of method 300 can be performed in different orders, either concurrently or serially. Further, steps can be performed in addition to those illustrated in method 300, and some steps illustrated in method 300 can be omitted without deviating from the present disclosure. Accordingly, other implementations are within the scope of the following claims.

What is claimed is:

1. A method performed with a computing system for business process management, the method comprising:
    identifying a business process model generated with a business process modeling tool;
    transforming the business process model defined in a first format to one or more artifacts defined in a second format, the transforming comprising:
        parsing the business process model into a directed graph comprising one or more typed nodes that define one or more process steps, and one or more edges that define one or more control flow connectors; and
        generating a plurality of tokens, wherein each of the plurality of tokens represents a thread of control within each of the one or more process steps by enabling a process execution order, and each of the plurality of tokens comprises a token identifier that triggers one of the one or more process steps, and a token position assigned to each of the one or more edges;
    deploying an output file defined by the one or more artifacts in an in-memory database; and
    executing the output file in an in-memory database based at least in part on one or more processes executing in the in-memory database in response to a received query for data stored in the in-memory database.

2. The method of claim 1, wherein the business process model defined in a first format comprises a business process model defined in BPMN 2.0, and the one or more artifacts defined in a second format comprise one or more SQL/SQL-Script definitions.

3. The method of claim 2, wherein transforming the business process model defined in a first format to one or more artifacts defined in a second format comprises compiling the business process model defined in BPMN 2.0 into the one or more SQL/SQLScript definitions.

4. The method of claim 3, wherein compiling the business process model defined in BPMN 2.0 into the one or more SQL/SQLScript definitions comprises:
    traversing the directed graph to generate a plurality of SQLScript fragments; and assembling the plurality of SQLScript fragments into the one or more SQL/SQLScript definitions.

5. The method of claim 1, wherein each of the one or more control flow connectors comprises a true execution condition or a false execution condition.

6. The method of claim 4, wherein traversing the directed graph to generate a plurality of SQLScript fragments comprises:
generating the plurality of SQLScript fragments based on the one or more process steps, each SQLScript fragment defining at least a queue sub-query of a particular process step.

7. The method of claim 2, wherein the one or more SQL/SQLScript definitions comprise at least one of a queue definition, a scheduler, and a process API.

8. The method of claim 7, further comprising:
emitting the output file comprising the queue definition, the scheduler, and the process API.

9. The method of claim 7, wherein the one or more SQL/SQLScript definitions further comprise one or more user-defined SQLScript procedures.

10. A non-transitory computer storage medium encoded with a computer program, the program comprising instructions that when executed by one or more computers cause the one or more computers to perform operations comprising:
identifying a business process model generated with a business process modeling tool;
transforming the business process model defined in a first format to one or more artifacts defined in a second format, the transforming comprising:
parsing the business process model into a directed graph comprising one or more typed nodes that define one or more process steps, and one or more edges that define one or more control flow connectors; and
generating a plurality of tokens, wherein each of the plurality of tokens represents a thread of control within each of the one or more process steps by enabling a process execution order, and each of the plurality of tokens comprises a token identifier that triggers one of the one or more process steps, and a token position assigned to each of the one or more edges;
deploying an output file defined by the one or more artifacts in an in-memory database; and
executing the output file in an in-memory database based at least in part on one or more processes executing in the in-memory database in response to a received query for data stored in the in-memory database.

11. The non-transitory computer storage medium of claim 10, wherein the business process model defined in a first format comprises a business process model defined in BPMN 2.0, and the one or more artifacts defined in a second format comprise one or more SQL/SQLScript definitions.

12. The non-transitory computer storage medium of claim 11, wherein transforming the business process model defined in a first format to one or more artifacts defined in a second format comprises compiling the business process model defined in BPMN 2.0 into the one or more SQL/SQLScript definitions.

13. The non-transitory computer storage medium of claim 12, wherein compiling the business process model defined in BPMN 2.0 into the one or more SQL/SQLScript definitions comprises:
traversing the directed graph to generate a plurality of SQLScript fragments; and
assembling the plurality of SQLScript fragments into the one or more SQL/SQLScript definitions.

14. The non-transitory computer storage medium of claim 10, wherein each of the one or more control flow connectors comprises a true execution condition or a false execution condition.

15. The non-transitory computer storage medium of claim 14, wherein traversing the directed graph to generate a plurality of SQLScript fragments comprises:
generating the plurality of SQLScript fragments based on the one or more process steps, each SQLScript fragment defining at least a queue sub-query of a particular process step.

16. The non-transitory computer storage medium of claim 11, wherein the one or more SQL/SQLScript definitions comprise at least one of a queue definition, a scheduler, and a process API.

17. The non-transitory computer storage medium of claim 16, wherein the operations further comprise:
emitting the output file comprising the queue definition, the scheduler, and the process API.

18. The non-transitory computer storage medium of claim 16, wherein the one or more SQL/SQLScript definitions further comprise one or more user-defined SQLScript procedures.

19. A system of one or more computers configured to perform operations comprising:
identifying a business process model generated with a business process modeling tool;
transforming the business process model defined in a first format to one or more artifacts defined in a second format, the transforming comprising:
parsing the business process model into a directed graph comprising one or more typed nodes that define one or more process steps, and one or more edges that define one or more control flow connectors; and
generating a plurality of tokens, wherein each of the plurality of tokens represents a thread of control within each of the one or more process steps by enabling a process execution order, and each of the plurality of tokens comprises a token identifier that triggers one of the one or more process steps, and a token position assigned to each of the one or more edges;
deploying an output file defined by the one or more artifacts in an in-memory database; and
executing the output file in an in-memory database based at least in part on one or more processes executing in the in-memory database in response to a received query for data stored in the in-memory database.

20. The system of claim 19, wherein the business process model defined in a first format comprises a business process model defined in BPMN 2.0, and the one or more artifacts defined in a second format comprise one or more SQL/SQLScript definitions.

21. The system of claim 20, wherein transforming the business process model defined in a first format to one or more artifacts defined in a second format comprises compiling the business process model defined in BPMN 2.0 into the one or more SQL/SQLScript definitions.

22. The system of claim 21, wherein compiling the business process model defined in BPMN 2.0 into the one or more SQL/SQLScript definitions comprises:
traversing the directed graph to generate a plurality of SQLScript fragments; and
assembling the plurality of SQLScript fragments into the one or more SQL/SQLScript definitions.

23. The system of claim 19, wherein each of the-one or more control flow connectors comprises a true execution condition or a false execution condition.

24. The system of claim 23, wherein traversing the directed graph to generate a plurality of SQLScript fragments comprises:
   generating the plurality of SQLScript fragments based on the one or more process steps, each SQLScript fragment defining at least a queue sub-query of a particular process step.

25. The system of claim 20, wherein the one or more SQL/SQLScript definitions comprise at least one of a queue definition, a scheduler, and a process API.

26. The system of claim 25, wherein the operations further comprise:
   emitting the output file comprising the queue definition, the scheduler, and the process API.

27. The system of claim 25, wherein the one or more SQL/SQLScript definitions further comprise one or more user-defined SQLScript procedures.

* * * * *